United States Patent Office 2,785,144
Patented Mar. 12, 1957

2,785,144

RESINOUS IMPREGNATING VARNISH AND ARTICLE PRODUCED THEREFROM

Joseph J. Wachter, Hampton, S. C., assignor to Westinghouse Electric Corporation, East Pittsburgh, Pa., a corporation of Pennsylvania No Drawing. Application February 13, 1953,
Serial No. 336,870

3 Claims. (Cl. 260—29.3)

This invention relates to a novel resinous impregnating varnish and a flame resistant article molded or laminated therefrom.

It has been proposed heretofore to embody zinc borate in resinous impregnating varnishes in order to impart flame resistant properties to articles molded or laminated from the varnish. Difficulties arose in this practice after admixing the zinc borate in the resin varnish with the zinc borate settling to the bottom of the storage tanks or drums and forming a hard cake thereon. Thus, once the zinc borate was admixed with the varnish, it was necessary to keep the suspension constantly agitated to prevent any settling. Once agitation was stopped, enough zinc borate would settle in a short time to form on the bottom of the vessel a hard cake that would be difficult, if not virtually impossible to get back into suspension.

Another undesirable feature incurred in admixing zinc borate in a resin varnish was the rapid rise in viscosity of the resulting suspension. The high viscosity of the suspension thus made impregnating a base fabric or paper and the subsequent treatment thereof a difficult operation.

A further difficulty with the use of an agitated resinous varnish suspension of zinc borate was that the articles produced therefrom were not entirely satisfactory. In their production by conventional methods, generally a base cloth or fabric sheet is impregnated with an A-stage resin varnish with zinc borate suspended therein. After the base fabric has been impregnated, it is passed by means of a series of rollers, through an oven where the solvent is driven off and the resin is advanced to the B-stage. The driving off of the solvent is accompanied by a formation of scaly zinc borate particles on the surface of the B-stage sheet. These particles of zinc borate are subsequently sloughed off as the sheet passes over the rollers and thus the flame resistance of the articles that are later produced from the B-stage sheets is greatly reduced. Also, the appearance of the finished article is marred by rough spots and pits formed on the surface by the sloughing off action.

An object of this invention is to provide a stabilized phenolic resin varnish for making flame resistant articles, the varnish having zinc borate suspended therein by means of a stabilizing agent selected from at least one of the group consisting of citric acid, tartaric acid, glutaric acid, itaconic acid and succinic acid.

An object of this invention is to provide a stabilized phenolic resin varnish having suspended therein a flame retardant of zinc borate by means of a stabilizing agent, the stabilizing agent maintaining the zinc borate in suspension and the varnish at a low viscosity.

A further object of this invention is to provide an improved flame resistant article of manufacture that is molded or laminated from a phenolic resin, the article produced having zinc borate evenly dispersed throughout the body thereof.

Other objects of the invention will in part be obvious and will in part appear hereinafter.

I have discovered that a novel resinous impregnating varnish can be produced by admixing with a phenolic resin an amount of zinc borate varying from 5% to 30% by weight, based on the weight of the resinous solids, and a small but effective amount up to 1% by weight, based on the weight of the resinous varnish, of a stabilizing agent selected from at least one of the group consisting of citric acid, tartaric acid, glutaric acid, itaconic acid and succinic acid, or mixtures of any two or more.

The phenolic resin referred to may be any well known conventional phenolic resin prepared by reacting phenol, cresol or cresylic acid with formaldehyde, paraformaldehyde, or other polymers thereof. As is well known in the art, cresylic acid comprises a mixture of cresols and xylenols of varying composition. The solvent to resin solids ratio may be varied from 40% to 60% by weight.

The stabilizing agent of citric acid, tartaric acid, glutaric acid, itaconic acid and succinic acid are used as received from commercial suppliers, in an amount up to 1% by weight, based on the weight of the resin varnish. No beneficial result is derived by using more than 1% of the stabilizing agent, because if an amount in excess of 1% is used, the resin varnish is made more acid than is desirable and staining of the laminate made therefrom may occur.

The flame retardant zinc borate is generally added to the resin varnish in an amount varying from 5% to 30% by weight, based on the weight of resin solids, the amount depending upon the properties desired in the article produced from the resin varnish. The zinc borate is admixed with the resin varnish in a finely divided state, the particle size not exceeding 100 mesh.

The stabilized resin varnish formulation of my invention may be used to impregnate any desirable base material, the material selected depending upon the properties desired in the molded or laminated article. For example, alpha paper and kraft paper are suitable for articles having electrical applications. For other uses where electrical properties are not important, duck cloth, asbestos cloth, asbestos paper and cambric cloth are well known base materials.

The base material may be impregnated with the resin varnish of my invention in any conventional manner, for example, as described in the patent to Weltman et al., No. 2,579,637. The resin ratio of the impregnant may be varied as desired from 1.75 up to 3.00. Resin ratio is defined as the ratio of the weight of the untreated fabric sheet plus the weight of the resin that is impregnated in the sheet to the weight of the untreated sheet.

*Example*

The following is an example of the preparation of the stabilized resin varnish in accordance with my invention. A conventional phenol formaldehyde resin varnish containing 50% resin solids was prepared, for example, as described in the patent to Weltman et al., No. 2,579,637. With this resin varnish, there was admixed 0.5% by weight of citric acid. To the varnish and acid mixture there was added 20% by weight, based on the weight of the resin solids, of finely divided 300 mesh zinc broate and this mixture was stirred for a short time until an evenly dispersed suspension was formed.

The suspension was used to impregnate duck cloth which was later molded by heat and pressure into laminated pulleys for use in aircraft where flame-resistant properties are required. The strength properties of the pulleys produced from the stabilized resin varnish were comparable with those made with an unstabilized varnish. These pulleys also retained their flame-resistant characteristics in the presence of high concentrations of moisture. They produced a better surface and had a more uniform appearance than the pulleys produced from a conventional unstabilized varnish.

The viscosity of my stabilized varnish rose only 6% in 24 hours. Even after 10 days when some settling had taken place, the state of the precipitate was quite fluffy and cloudlike, so that it was readily redispersed throughout the stabilized solution by merely stirring for a few minutes. The viscosity of an unstabilized varnish prepared in the same manner and with the same ratio of ingredients as described above, quadrupled in 24 hours and the zinc borate settled and formed a hard cake in the bottom of the storage vessel.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A resinous varnish adapted for impregnation into fibrous base material comprising a phenolic resin derived by reacting a phenol selected from at least one of the group consisting of phenol, cresol, and xylenol and an aldehyde selected from the group consisting of formaldehyde and polymers of formaldehyde, a solvent for said resin, zinc borate dispersed in the varnish in an amount of from 5% to 30% by weight, based on the weight of the resin, and a stabilizing agent in a small but effective amount up to 1% by weight, based on the weight of the varnish, to maintain the zinc borate evenly dispersed throughout the varnish, the stabilizing agent being citric acid.

2. A resinous varnish adapted for impregnation into fibrous base material comprising a phenolic resin derived by reacting a phenol selected from at least one of the group consisting of phenol, cresol, and xylenol and an aldehyde selected from the group consisting of formaldehyde and polymers of formaldehyde, a solvent for said resin, zinc borate dispersed in the varnish in an amount of from 5% to 30% by weight based on the weight of the resin, and a stabilizing agent in a small but effective amount up to 1% by weight, based on the weight of the varnish, to maintain the zinc borate evenly dispersed throughout the varnish, the stabilizing agent being selected from at least one of the group consisting of citric acid, tartaric acid, glutaric acid, itaconic acid and succinic acid.

3. An article of manufacture comprising a base material impregnated with the solvent-free resinous varnish of claim 2.

References Cited in the file of this patent

UNITED STATES PATENTS 2,519,388    Lonkomsky _____ Aug. 22, 1950

FOREIGN PATENTS 182,886    Great Britain _____ July 6, 1922